United States Patent
Rhodes

(10) Patent No.: US 7,602,696 B2
(45) Date of Patent: Oct. 13, 2009

(54) ADAPTIVE GUARD INTERVALS IN OFDM SYSTEMS

(75) Inventor: Valentine J. Rhodes, Scottsdale, AZ (US)

(73) Assignee: Intel Corporation, Santa Clara, CA (US)

(*) Notice: Subject to any disclaimer, the term of this patent is extended or adjusted under 35 U.S.C. 154(b) by 474 days.

(21) Appl. No.: 10/607,798

(22) Filed: Jun. 27, 2003

(65) Prior Publication Data

US 2004/0264431 A1 Dec. 30, 2004

(51) Int. Cl.
*H04J 11/00* (2006.01)
*H04B 1/38* (2006.01)
*H04L 5/12* (2006.01)
*H04L 27/06* (2006.01)

(52) U.S. Cl. ............... 370/208; 370/343; 370/480; 375/219; 375/262; 375/265; 375/316

(58) Field of Classification Search ............... 370/334, 370/343, 344, 319, 204, 338, 208, 341, 480, 370/230, 296, 270; 375/295, 316, 133, 219, 375/260–270, E1.002; 455/455, 69
See application file for complete search history.

(56) References Cited

U.S. PATENT DOCUMENTS

| | | | |
|---|---|---|---|
| 6,470,030 B1 * | 10/2002 | Park et al. | 370/480 |
| 6,768,778 B1 * | 7/2004 | Chen et al. | 375/262 |
| 2003/0165113 A1 | 9/2003 | Hudson | |

FOREIGN PATENT DOCUMENTS

| | | |
|---|---|---|
| EP | 1 065 855 | 1/2001 |
| EP | 1065855 A1 * | 1/2001 |
| WO | WO 97/30531 | 8/1997 |

* cited by examiner

*Primary Examiner*—Afsar M. Qureshi

(57) ABSTRACT

Dynamic guard interval adaptation is provided for devices having differing delay spreads in an OFDM communication system to reduce the guard intervals, with adaptation controlled by either the wireless communications device or the network.

16 Claims, 4 Drawing Sheets

ADAPTIVE GUARD INTERVALS IN OFDM SYSTEMS

Orthogonal Frequency-Division Multiplexing (OFDM) is a method of digital modulation in which a signal is split into several narrowband channels at different frequencies. The multicarrier modulation technique of OFDM has been adopted to minimize the influence of Inter-Symbol Interference (ISI) due to multipath propagation and to avoid the application of sophisticated equalizer techniques and expensive adaptive antennas. Current OFDM systems use a predetermined guard interval that is conservatively designed for the longest anticipated delay spread that overcomes multipath propagation delays. However, this conservative guard interval increases the time required for each packet transfer.

It would be advantageous to have an improved method for shortening the guard interval, and thus, reduce the time for packet transfers.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements illustrated in the figures have not necessarily been drawn to scale. For example, the dimensions of some of the elements are exaggerated relative to other elements for clarity.

DETAILED DESCRIPTION OF THE DRAWINGS

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Embodiments of the present invention may be used in a variety of applications, with the claimed subject matter incorporated into microcontrollers, general-purpose microprocessors, Digital Signal Processors (DSPs), Reduced Instruction-Set Computing (RISC), Complex Instruction-Set Computing (CISC), among other electronic components. In particular, the present invention may be used in laptop computers, smart phones, communicators and Personal Digital Assistants (PDAs), medical or biotech equipment, automotive safety and protective equipment and automotive infotainment products. However, it should be understood that the scope of the present invention is not limited to these examples.

Figure 1:
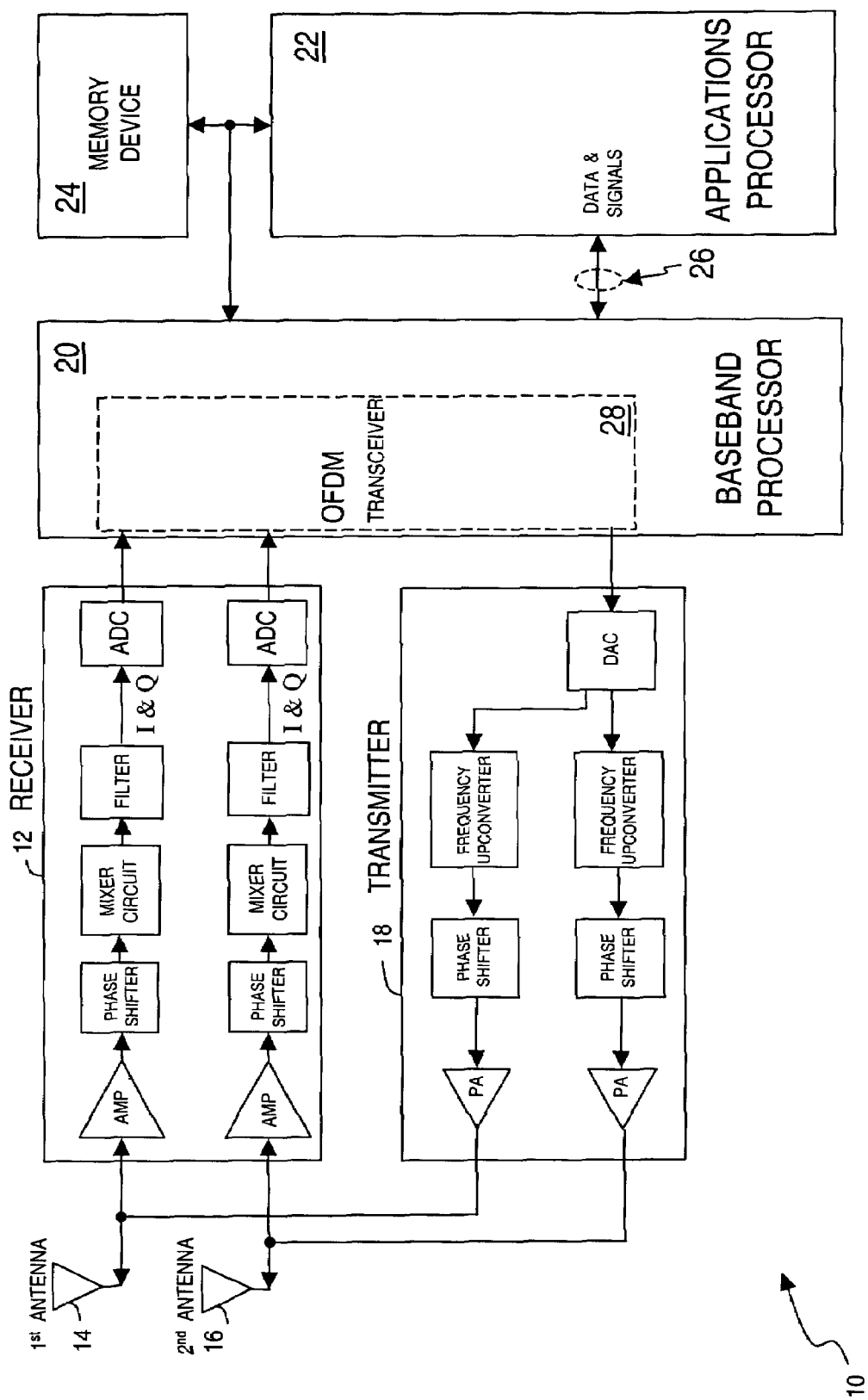
FIG. 1 illustrates a wireless communications device having features for puncturing carriers in accordance with the present invention.

FIG. 1 illustrates a wireless communications device 10 having features for evaluating and selecting signals received from multiple antennas in accordance with the present invention. In this device the transceiver receives and transmits modulated signals from antennas 14 and 16, although the number of antenna is not a limitation of the present invention. The receiver chain may include amplifiers such as, for example, Low Noise Amplifiers (LNAs) and Variable Gain Amplifiers (VGAs) to amplify signals received from the selected antenna. Then, a mixer circuit receives the modulated signals and down-converts the carrier frequency of the modulated signals. The down-converted signals may then be filtered and converted to a digital representation by Analog-To-Digital Converters (ADCs).

A baseband processor 20 may be connected to the ADC to provide, in general, the digital processing of the received data within communications device 10. Baseband processor 20 may process the digitized quadrature signals, i.e., the in-phase "I" signal and the quadrature "Q" signal from the receiver chain. In accordance with the present invention baseband processor 20 may include an Orthogonal Frequency Division Multiplexing (OFDM) transceiver 28 for providing digital processing of information associated with the analog transceiver. On the transmitter side, transmitter 18 may receive digital data processed by baseband processor 20 and use the Digital-to-Analog Converter (DAC) to convert the digital data to analog signals for transmission from the multiple antennas 14 and 16. Note that receiver 12 and/or transmitter 18 may be embedded with baseband processor 20 as a mixed-mode integrated circuit, or alternatively, the transceiver may be a stand-alone Radio Frequency (RF) integrated circuit such as, for example, an Application Specific Integrated Circuit (ASIC).

An applications processor 22 may be connected to baseband processor 20 through a signaling interface 26 that allows data to be transferred between baseband processor 20 and applications processor 22. A memory device 24 may be connected to baseband processor 20 and applications processor 22 to store data and/or instructions. In some embodiments, memory device 24 may be a volatile memory such as, for example, a Static Random Access Memory (SRAM), a Dynamic Random Access Memory (DRAM) or a Synchronous Dynamic Random Access Memory (SDRAM), although the scope of the claimed subject matter is not limited in this respect. In alternate embodiments, the memory devices may be nonvolatile memories such as, for example, an Electrically Programmable Read-Only Memory (EPROM), an Electrically Erasable and Programmable Read Only Memory (EEPROM), a flash memory (NAND or NOR type, including multiple bits per cell), a Ferroelectric Random Access Memory (FRAM), a Polymer Ferroelectric Random Access Memory (PFRAM), a Magnetic Random Access Memory (MRAM), an Ovonics Unified Memory (OUM), a disk memory such as, for example, an electromechanical hard disk, an optical disk, a magnetic disk, or any other device capable of storing instructions and/or data. However, it should be understood that the scope of the present invention is not limited to these examples.

Figure 2:
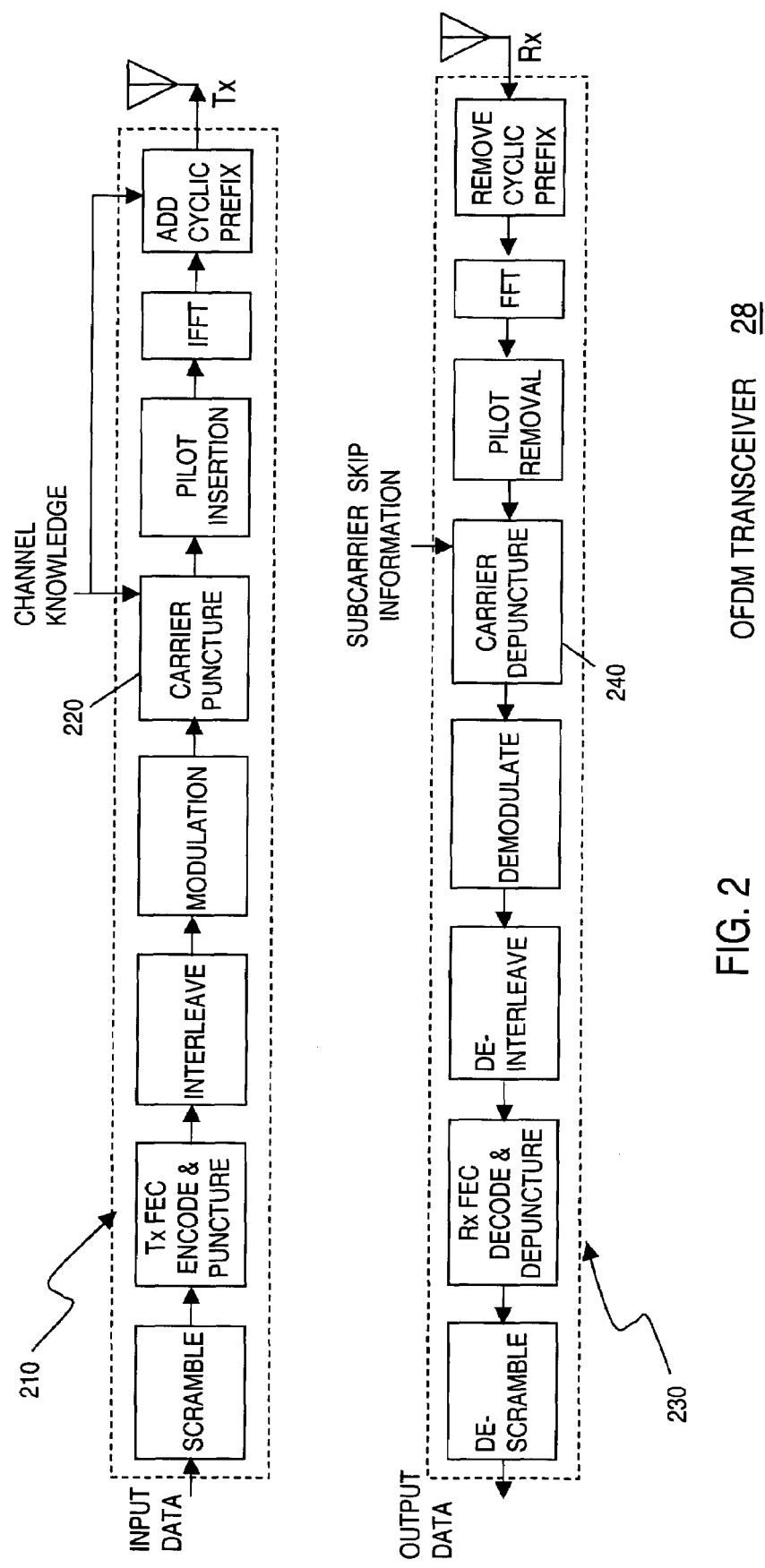
FIG. 2 is a block diagram for dynamically selecting and puncturing carriers based on channel variations that affect signals received by the wireless communications device.

FIG. 2 is a block diagram showing one embodiment of an OFDM transceiver architecture that may be implemented in baseband processor 20. OFDM is a special form of multicarrier modulation, particularly suited for transmission over a dispersive channel. In a multipath channel, an OFDM transmitter 210 splits a high-rate data stream into N parallel low rate streams, each transmitted over a separate, orthogonal subcarrier. The scrambler may be used to reduce the likelihood of a long sequence of zeros or ones. The Tx Forward Error Correction (FEC) encoder provides error correction, and in some cases, may reduce unnecessarily large amounts of redundancy in the channel encoded data stream. The convolutional interleaver makes burst errors distributed among different codewords so as to enhance error-correcting capability.

A carrier puncture circuit 220 dynamically selects and punctures subcarriers based on knowledge of channel variations that affect signals received by wireless communications device 10. Following the complex IFFT, a guard interval may be added to the useful part of the OFDM symbol resulting in an overall OFDM symbol length. Then, the preambles necessary for synchronization and channel estimation may be inserted once per frame and the baseband signal converted from a digital signal to an analog IF signal (see FIG. 1) and readied for transmission.

On the receiver side 230, the analog IF is down converted to digital baseband. Following that, synchronization is performed to synchronize the receiver in time and frequency. The guard interval is removed and the complex FFT is performed. Channel estimation and equalization are carried out to provide the equalized values and the corresponding fading coefficients for every subcarrier. A carrier depuncture circuit 240 may or may not be included. When included, carrier depuncture circuit 240 has information on carriers that are selected to be skipped. The symbols loaded on subcarriers are handed over to the demodulator which calculates values for every coded bit. The latter are processed in the decoder to obtain the information bits.

Figure 3:
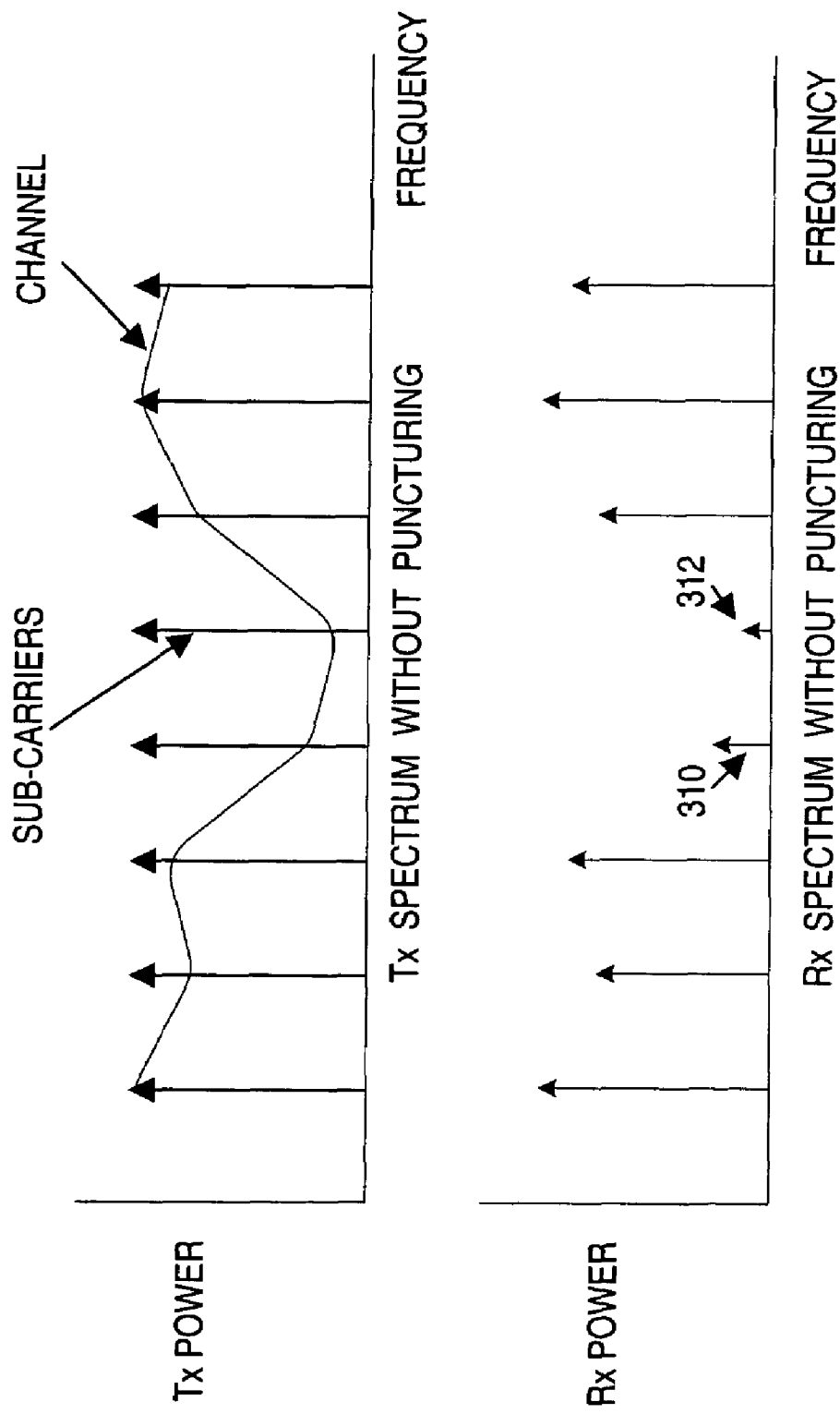
FIG. 3 illustrates carriers for the transmitter and the receiver with the puncturing feature disabled.

FIG. 3 illustrates subcarrier information and the corresponding channel variations for a transmitter Tx and a receiver Rx where the puncturing feature is disabled. The OFDM symbols are comprised of subcarriers across the spectrum of the OFDM symbol, with the subcarriers spaced apart on the horizontal frequency axis. Each subcarrier is shown in the transmitter Tx having common power. However, some subcarriers received by the receiver Rx are attenuated and received at a reduced power when affected by channel variations.

Figure 4:
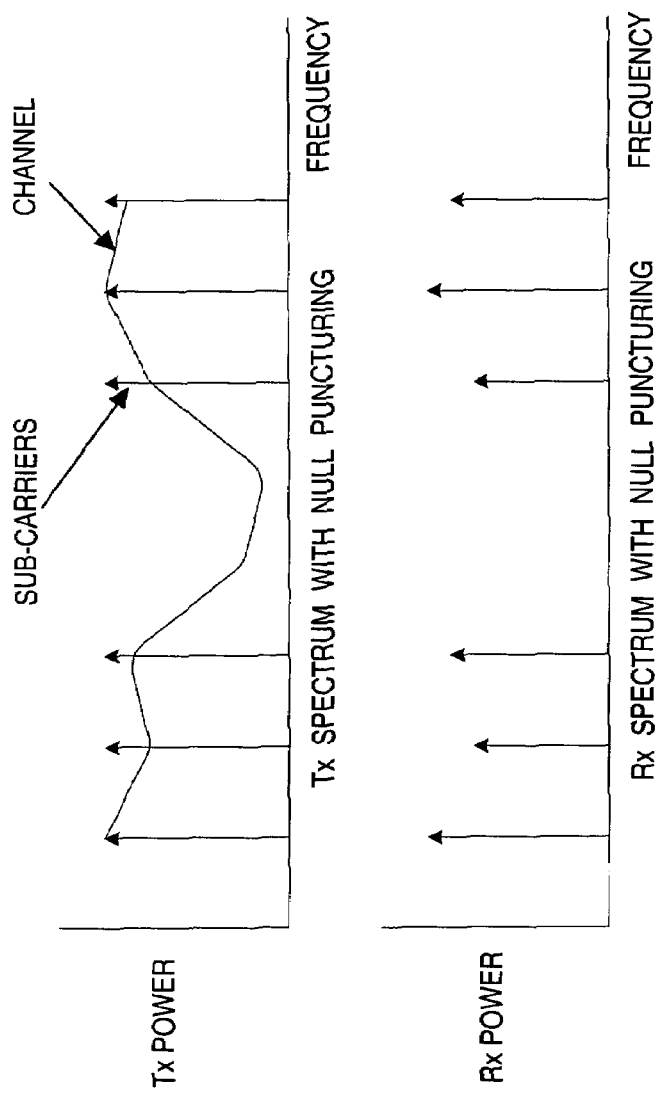
FIG. 4 illustrates carriers for the transmitter and the receiver with the puncturing feature enabled.
Figure 5:
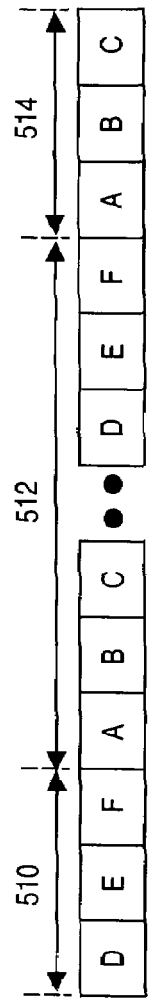
FIG. 5 illustrates a symbol having a dynamically adjustable guard interval in accordance with the present invention.

FIG. 4 illustrates subcarrier information and the corresponding channel variations for a transmitter Tx and a receiver Rx where the puncturing feature is enabled. Referring to FIGS. 2 and 4, carrier puncture circuit 220 receives channel knowledge about variations or channel effects for each of the subcarriers. Channel knowledge may include singular effects or combination effects from multipath fading, in-band interference or active electronic devices, among others. For instance, signals may be corrupted by multiple propagation paths that may combine destructively, resulting in deeply faded signal strength at the mobile receiver. In addition, pedestrian or vehicular motion induces Doppler frequency shifts on multipath components, resulting in a time variation of the faded multi-path channel. Interference, for example, may be caused by other users operating cordless phones or microwave products, whereas electronic effects may be a result of an undesired roll-off of low noise amplifiers or unwanted notches in filters of analog circuitry in the transceiver of wireless communications device 10.

Where channel knowledge so dictates, subcarriers may be selected for puncturing, i.e., information and/or energy may be removed from the subcarriers. Comparing FIGS. 3 and 4, subcarriers 310 and 312 have been punctured when the puncturing feature is enabled. In accordance with features of the present invention and claimed subject matter, several methods of puncturing are envisioned. In one embodiment subcarriers may be punctured by placing energy in the subcarrier without including any modulated data or information. Further, the punctured subcarriers may then be used to reduce the Peak-to-Average Power Ratio (PAPR) of the OFDM symbol. One possibility for reducing the peak power includes controlling and adjusting the phase for the symbol in the transmitter.

In another embodiment subcarriers may be punctured, i.e., removed, by placing no energy in the punctured subcarriers and maintaining the power level for the remaining subcarriers. Alternatively, a percentage or all of the power of the punctured subcarriers may be redistributed to some or all the remaining subcarriers. In yet another embodiment, subcarriers may be punctured, with or without energy, to avoid in-band spectral interference. The power may be redistributed to other subcarriers.

Prior art OFDM systems place information in all subcarriers and then rely on coding to reproduce the information contained in subcarriers that experience attenuation based on the channel. In contrast, the present invention provides subcarrier puncturing that may place no information in subcarriers that suffer from channel impairments where they cannot deliver information. If no energy is placed in these subcarriers, then the transmitted power may be re-allocated to the information carrying subcarriers to increase the Signal-to-Noise Ratio (SNR) at the target node. Or, the present invention may place energy in subcarriers that suffer from channel impairments, but reduce the PAPR of the OFDM symbol.

OFDM is used because it is a multi-carrier (or multi-tone) modulation technique where the carriers (tones) are orthogonal. If they were not orthogonal, they could be generated by the superposition of multiple tones. Since they are orthogonal, a Discrete Fourier Transform (DFT) and hence Fast Fourier Transform (FFT) may be used. The OFDM symbol 512 may be prolonged by periodically repeating the 'head' 514 and the 'tail' 510 of the symbol. Thus, the packet is prepared for transmission by Tx transmitter 210 by appending a cyclic prefix to the packet and a cyclic suffix to the packet. At Rx receiver 230 this prefix and suffix guard interval is removed. This guard interval is adjusted to be sufficiently long and exceed the maximum channel delay, and thus, all reflections of the previous symbols are removed and the orthogonality is preserved. In this manner an OFDM communication system uses a guard interval to eliminate Inter-Symbol Interference (ISI) between OFDM symbols. However, since the packet is surrounded by guard intervals, some parts of the signal cannot be used for transmitting information.

In accordance with one embodiment of the present invention, either the target node determines the guard interval from the source transmission or the source node determines the guard interval from the target transmission. This channel knowledge information may be used to set the length of the guard intervals (510, 514). Whereas current OFDM systems append the packet with a fixed guard interval that is conservatively designed for the longest anticipated delay spread, wireless communications device 10 determines a delay spread estimate for the guard interval that is dynamically changed and updated. In other words, multipath reflections that cause channel delays may be periodically measured and the guard intervals may be dynamically set to account for any changes in the channels. The present invention dynamically updates the guard intervals to reduce the time for each packet transfer. Since the guard interval must be known a-priori by the target node to demodulate the OFDM symbol, once determined, the guard interval may be communicated between communications device 10 and other devices.

It should be pointed out that the hidden nodes in a Time Division Duplex (TDD) OFDM communication system may attempt to use the same channel at the same time. These hidden nodes may be located farther in distance from the transmitting source than a target receiver. The longer propagation distances equate to longer delay spreads which need longer guard intervals for ISI mitigation. Several embodiments are presented to provide guard interval adaptation to reduce the guard intervals, with adaptation controlled by either wireless communications device 10 or the network.

The one embodiment previously mentioned provides for the source node to inform other nodes of the guard interval that is to be commonly used. In another embodiment, two nodes may set their respective guard intervals following a transmission from the source node to the target node and back again to the source node. In yet another embodiment, all nodes associated with the source node may transmit information to inform the source node of their respective guard interval. Once received, the source node then determines the appropriate guard interval and informs the nodes of the guard interval to be used. Alternatively, the target node may inform the source node of the guard interval that is to be used and the source node then uses that guard interval for subsequent transmissions to the target node. Once the data transfer is complete, the target node and the source node may or may not be programmed to revert back to a previous baseline guard interval that was negotiated with all nodes associated with the source node. These embodiments provide safe guard intervals that enable communication between wireless devices, whether the devices are "hidden" or not.

By now it should be apparent that a method and circuitry have been presented for incorporating channel knowledge into decisions on subcarrier puncturing. The signal quality may be dynamically evaluated and channel knowledge generated to ensure that the wireless device has high performance. Further, features of the present invention shorten the time needed for a data packet transfer and ensure that the guard interval related to the "on-air" duration of a transfer is known a-priori to all nodes, whether hidden or not.

It should be pointed out that the term "subcarrier" has been used throughout to describe some communications networks such as Wireless Local-Area Networks (WLANs) and LANs such as IEEE 802.11 that use OFDM, but one skilled in the art may substitute and use the term "carrier" instead of subcarrier when considering other communications networks.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:

1. A multicarrier communication system, comprising:
a processor having an Orthogonal Frequency-Division Multiplexing (OFDM) transceiver operative to use channel knowledge to dynamically select and puncture one or more subcarriers for a packet prior to transmission, and channel delay spread knowledge that is used to dynamically adjust a guard interval of a the packet prior to transmission;
wherein the OFDM transceiver is operative to receive a guard interval from a target node and the source node then uses that guard interval for subsequent transmissions to the target node; and
wherein the source node is programmed to revert back to a previous baseline guard interval that was negotiated with all nodes associated with the source node.

2. The system of claim 1 wherein the OFDM transceiver is operative to adjust the guard interval by appending a cyclic prefix to the packet that dynamically changes with updated channel delay spread knowledge.

3. The system of claim 1 wherein the OFDM transceiver is operative to adjust the guard interval by appending a cyclic suffix to the packet that dynamically changes with updated channel delay spread knowledge.

4. The system of claim 1 wherein the OFDM transceiver is operative to adjust the guard interval by appending both a cyclic prefix and a cyclic suffix to the packet that dynamically changes with updated channel delay spread 5. The system of claim 1 wherein the multicarrier communication system is an Orthogonal Frequency-Division Multiplexing (OFDM) communication system.

6. The system of claim 1 wherein the OFDM transceiver is operative to determine the guard interval from a source transmission to set the guard interval.

7. The system of claim 1 wherein the OFDM transceiver is operative to determine the guard interval from a target transmission to set the guard interval.

8. The system of claim 1 wherein the OFDM transceiver is operative to receive measured multipath reflections to provide channel delay spread knowledge to set the guard interval and remove Inter-Symbol Interference (ISI.

9. The system of claim 1 wherein the multicarrier communication system is a Time Division Duplex (TDD) OFDM communication system that includes a source node with the OFDM transceiver, the source node to inform other nodes in the system of the guard interval that is to be commonly used.

10. The system of claim 9, wherein the OFDM transceiver is operative to set the guard intervals following a transmission from the source node to a target node and back again to the source node.

11. The system of claim 9 wherein the OFDM transceiver is operative to receive guard interval information from one or more associated nodes, and once received, the source node determines the appropriate guard interval and informs the nodes of the guard interval to be used.

12. A communication system having Orthogonal Frequency-Division Multiplexing (OFDM) devices, a first OFDM device comprising:
an analog transceiver having a receiver chain to demodulate a packet;
a processor coupled to the receiver chain, the processor having an OFDM transceiver operative to receive the packet and use channel knowledge to dynamically select and puncture one or more subcarriers for a packet prior to transmission, to to adjust a guard interval of the packet prior to transmission based on a guard interval received from a target node, and to revert back to a baseline guard band interval that was negotiated with all nodes associated with the transceiver; and
a Static Random Access Memory (SRAM) memory coupled to the processor.

13. The communications system of claim 12 wherein the OFDM transceiver is operative to periodically receive channel delay spread knowledge updates and dynamically change the guard interval for further transmissions.

14. The communications system of claim 12 further including:
other OFDM devices to transmit guard interval information to the first OFDM device, the first OFDM device to use the OFDM transceiver to determine a guard interval, and transmit the guard interval using the analog transceiver to the other OFDM devices.

15. A method comprising:
measuring channel delays from multipath reflections in an Orthogonal Frequency-Division Multiplexing (OFDM) system to form channel knowledge and recurrent channel delay spread knowledge;
using the channel knowledge to dynamically select and puncture one or more subcarriers for a packet prior to transmission; and
adjusting a guard interval of the packet prior to transmission based on a guard interval received from a target node; and
reverting back to a previous baseline guard interval.

16. The method of claim 15, further including:
transmitting the recurrent channel delay spread knowledge to inform other nodes in the system of the guard interval that is to be commonly used.

* * * * *

UNITED STATES PATENT AND TRADEMARK OFFICE
CERTIFICATE OF CORRECTION

PATENT NO.       : 7,602,696 B2                                      Page 1 of 1
APPLICATION NO.  : 10/607798
DATED            : October 13, 2009
INVENTOR(S)      : Valentine J. Rhodes It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1142 days.

Signed and Sealed this

Fifth Day of October, 2010

David J. Kappos
*Director of the United States Patent and Trademark Office*